United States Patent [19]
Kondo et al.

[11] Patent Number: 5,760,500
[45] Date of Patent: Jun. 2, 1998

[54] XY TABLE USING A LINEAR ELECTROMAGNETIC ACTUATOR

[75] Inventors: Takuo Kondo; Shouji Fujisawa; Norimitsu Kitade, all of Kanagawa, Japan

[73] Assignee: Nippon Thompson Co., Ltd., Tokyo, Japan

[21] Appl. No.: 819,767

[22] Filed: Mar. 18, 1997

[30] Foreign Application Priority Data

Mar. 28, 1996 [JP] Japan ................... 8-099401

[51] Int. Cl.⁶ ................... H02K 41/00; G05G 11/00
[52] U.S. Cl. ................... 310/12; 33/1 M; 74/479.01; 248/913
[58] Field of Search ................... 310/12; 33/1 M; 346/139 B; 74/479.01, 490.09; 108/20, 143; 248/661, 913

[56] References Cited

U.S. PATENT DOCUMENTS

| | | | |
|---|---|---|---|
| 4,575,652 | 3/1986 | Gogue | 310/49 R |
| 5,228,358 | 7/1993 | Sakino et al. | 74/479 R |
| 5,523,941 | 6/1996 | Burton et al. | 318/135 X |
| 5,699,621 | 12/1997 | Trumper et al. | 33/1 M |

*Primary Examiner*—Steven L. Stephan
*Assistant Examiner*—Judson H. Jones
*Attorney, Agent, or Firm*—Sughrue, Mion, Zinn, Macpeak & Seas, PLLC

[57] ABSTRACT

An XY table that uses linear electromagnetic actuators to achieve faster operating speeds, improve durability, prevent generation of dust and reduce size (make more compact). The cord for supplying electrical power to the linear electromagnetic actuators and the cords for obtaining signals from each type of sensor are concentrated at an intermediate movement member (X table), and gathered together into a single cord that is used for connection to the outside (controller, etc.). As a result, detrimental effects caused by the cord are minimized which enables the XY table to demonstrate the performance described above.

7 Claims, 11 Drawing Sheets

XY TABLE USING A LINEAR ELECTROMAGNETIC ACTUATOR

BACKGROUND OF THE INVENTION

1. Field of the Invention

The present invention relates to an XY table positioning apparatus (to be referred to as an XY table) that holds an object (driven object) and positions and guides that object two-dimensionally with high precision, and more particularly, to that equipped with a linear electromagnetic actuator as its drive source.

2. Description of the Prior Art

In recent years, XY tables that position by guiding two-dimensional, namely planar, motion have come to be commonly used accompanying the growth of the electronic industry and so forth. The applications for XY tables using a linear electromagnetic actuator instead of a ball screw and so forth for their drive source have expanded accompanying demands for higher operating speeds.

At present, development is proceeding in the fields of machine tools, industrial robots and so forth in which said XY table is to be incorporated for the purpose of achieving faster operating speeds, improving durability, preventing generation of dust and reducing size (making more compact).

SUMMARY OF THE INVENTION

The object of the present invention is to provide an XY table that contributes to achieving the above-mentioned object.

In addition, the present invention provides an XY table that is also able to offer other advantages.

In order to achieve the above-mentioned object, the XY table as claimed in the present invention is equipped with relative movement members arranged on both outer sides, an intermediate movement member arranged between said relative movement members, a guiding device that guides said relative movement members and intermediate movement member while allowing to freely perform relative movement, and linear electromagnetic actuators that provide driving force between each of said relative movement members and said intermediate movement member; wherein, each primary side of said linear electromagnetic actuators is provided on said intermediate movement member, and supply of electrical power and so forth to said linear electromagnetic actuators is performed in said intermediate movement member.

In addition, each of the following constitutions are employed in order to obtain various other effects.

Namely, in the XY table of the present invention, an opening is formed in said intermediate movement member, and electrical connection is performed through said opening.

Moreover, in the above-mentioned XY table, drive substrates for performing supply of electrical power and so forth to the above-mentioned linear electromagnetic actuators are provided on both sides of the above-mentioned intermediate movement member, and connection between said drive substrates is performed by connectors passing through the above-mentioned opening.

In addition, the above-mentioned XY table is equipped with a detection device that detects the relative positions of the above-mentioned relative movement members and above-mentioned intermediate movement member, and said detection device has detected portions attached to the above-mentioned relative movement members, and a detecting portion installed on the above-mentioned intermediate movement member.

Next, in the above-mentioned XY table, the supply of electrical power and so forth to the above-mentioned linear electromagnetic actuators and the above-mentioned detecting portion is centralized in a single location and connected with the outside.

In addition, in the above-mentioned XY table, the above-mentioned linear electromagnetic actuators are linear direct current motors, the above-mentioned detection device has a reference position signal generation device, and said reference position signal generation device is composed of a plurality of magnetic sensors which emit a signal in response to a field magnet of said linear direct current motor, and which are arranged in a row at a pitch smaller than the width of the magnetic poles of said field magnet.

In addition, in the above-mentioned XY table, the above-mentioned guiding device is equipped with a pair of track members, in which tracks are formed along the lengthwise direction, that are arranged so that said corresponding tracks are in mutual opposition, rolling elements arranged between said tracks, and a cage that holds said rolling elements while allowing to rotate freely.

DESCRIPTION OF THE PREFERRED EMBODIMENTS

The following provides an explanation of an embodiment of the present invention while referring to the attached drawings.

Figure 1:
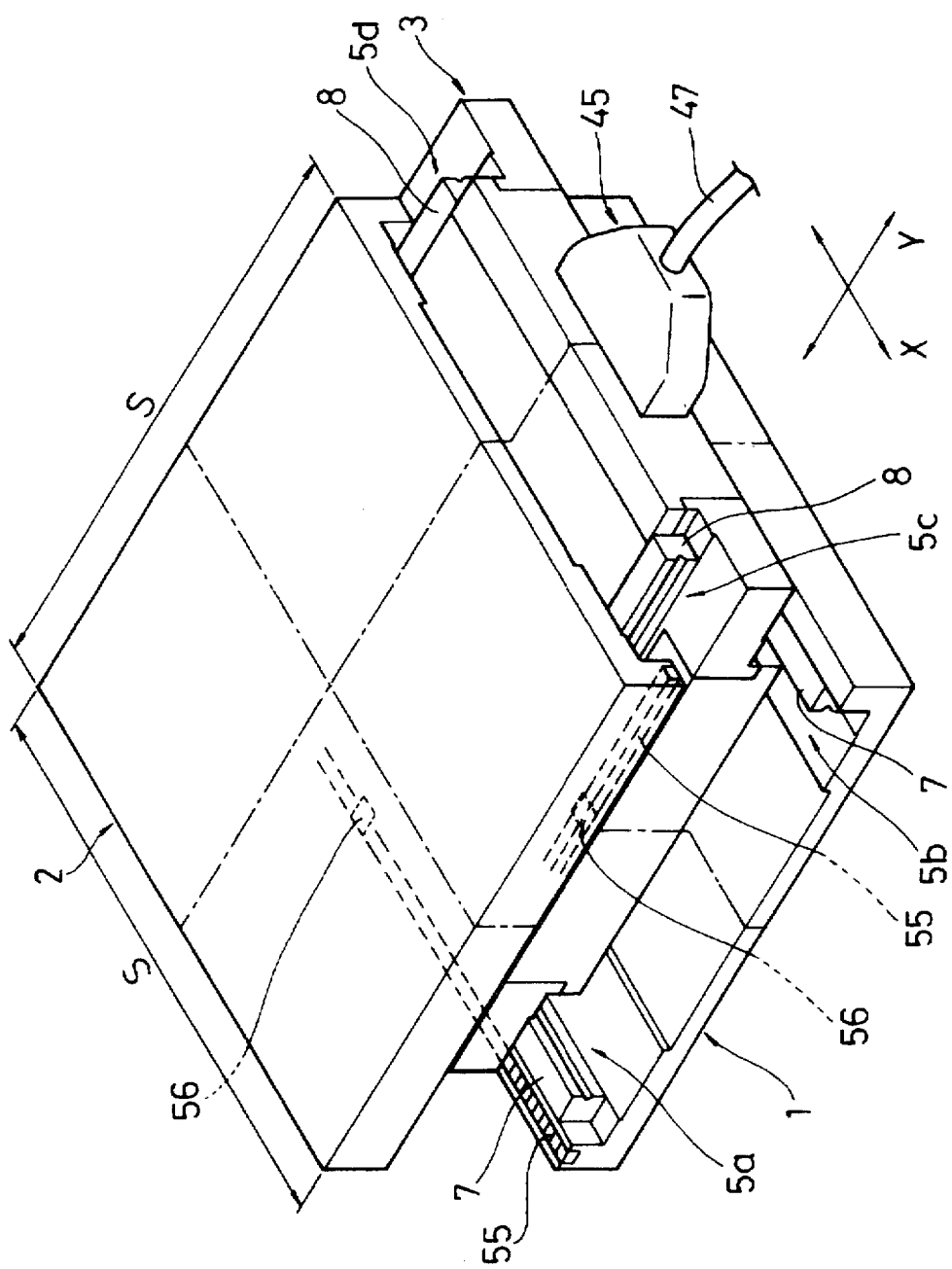
FIG. 1 is a perspective view of an XY table as an embodiment of the present invention.
Figure 2:
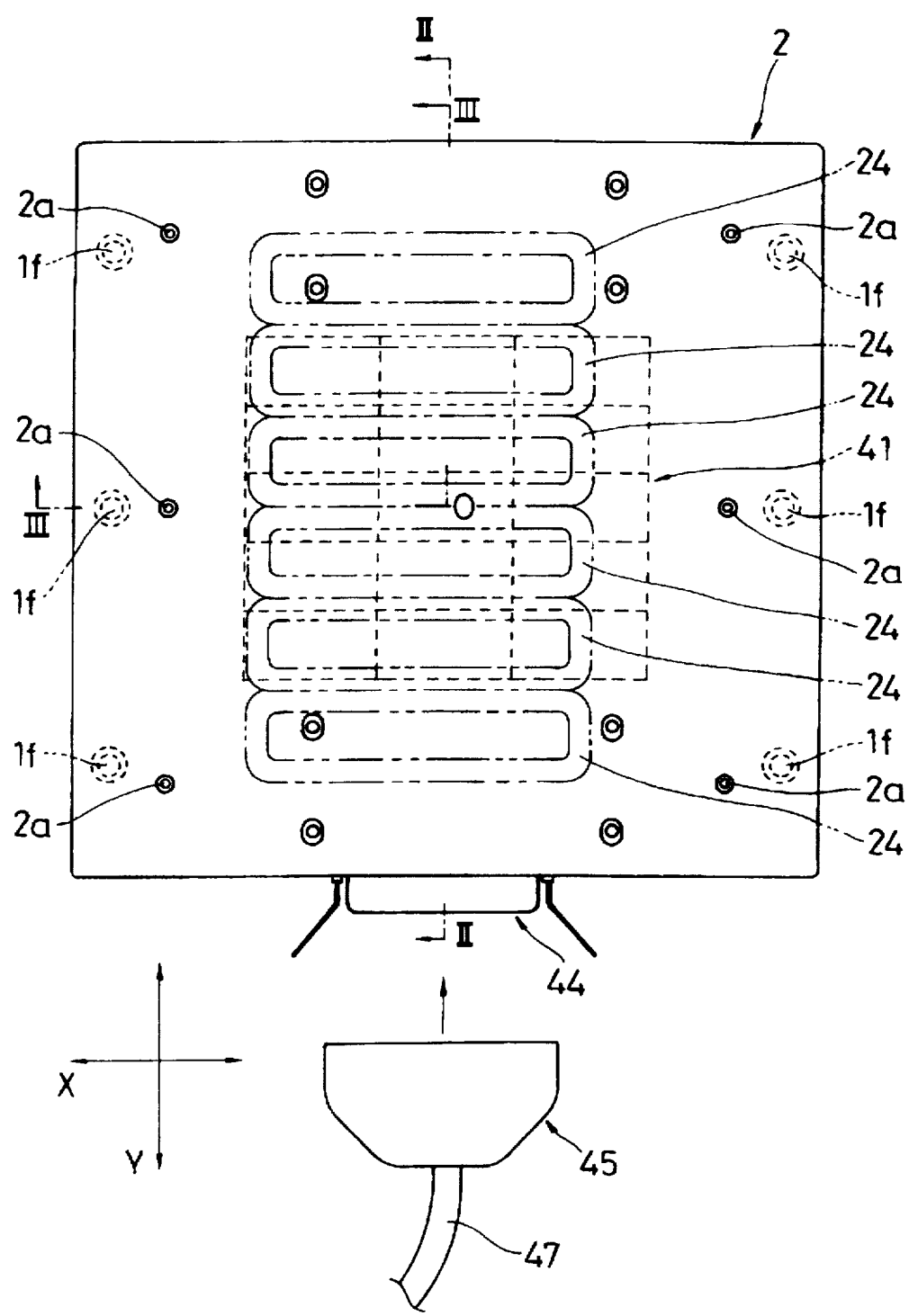
FIG. 2 is an overhead view of the XY table shown in FIG. 1.
Figure 3:
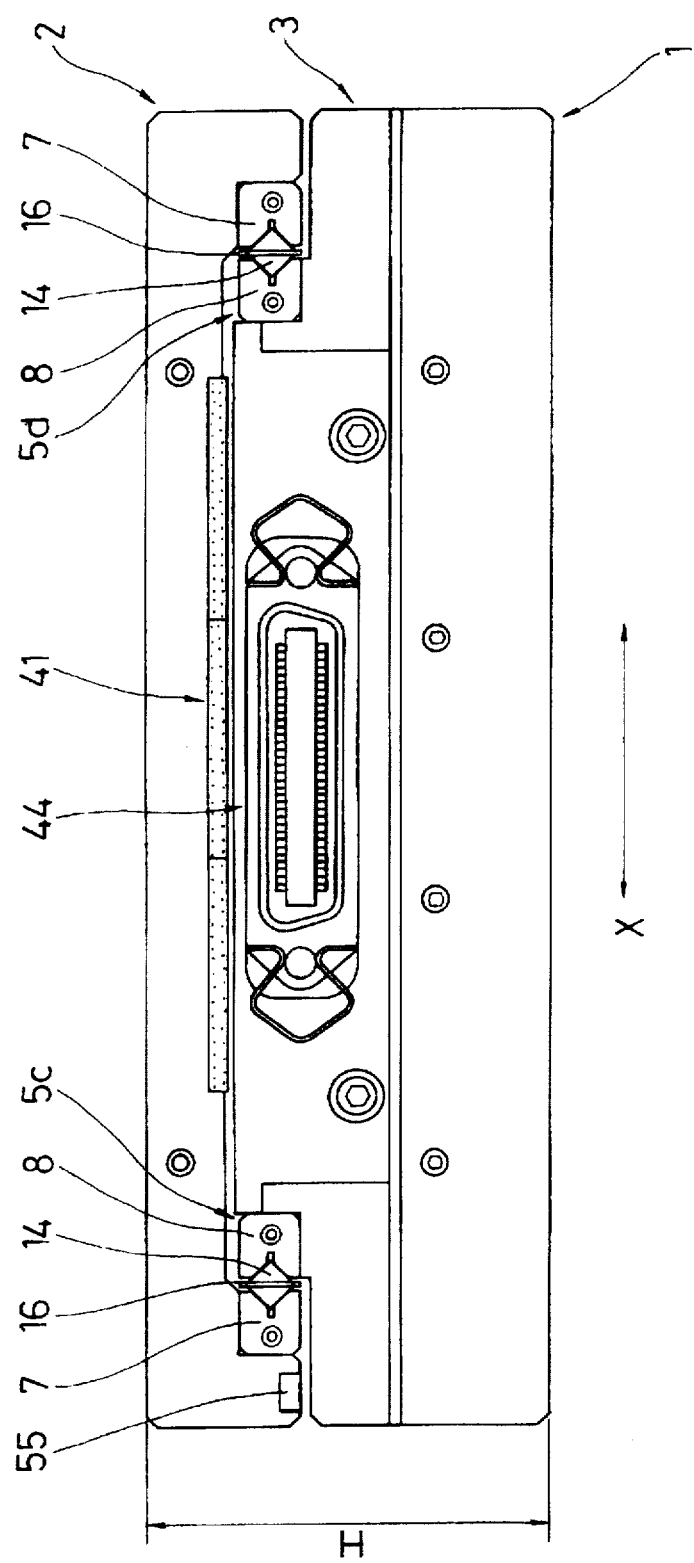
FIG. 3 is a front view of the XY table shown in FIGS. 1 and 2.

FIGS. 1 through 3 are, respectively, a perspective view, overhead view and front view of an XY table as claimed in the present invention. Said XY table has relative movement members in the form of bed 1 and Y table 2, respectively, arranged on both outer sides, and an intermediate movement member in the form of X table 3 arranged between said bed 1 and Y table 2. However, FIG. 1 shows Y table 2 and X table 3 moved slightly from their reference positions, while FIGS. 2 and 3 show both said tables in their reference positions.

The planar shape of bed 1, Y table 2 and X table 3 is the same for all three components, namely a square. The length S of one side of each square (see FIG. 1) is set to be the same for each component, for example 200 mm.

In addition, the dimension indicated with reference numeral H in FIG. 3, namely the height of said XY table, is set to, for example, 60 mm.

In the case of the present embodiment, the reference position of the above-mentioned Y table 2 is the position at which said Y table 2 overlaps directly above X table 3 without shifting out of position. The reference position of X table 3 is similarly the position at which said X table 3 overlaps bed 1 without shifting out of position. In other words, when X table 3 and Y table 2 are both at the reference position, bed 1, X table 3 and Y table 2 are perfectly overlapped. The operating strokes of X table 3 and Y table 2 are set to, for example, 40 mm to one side and 40 mm to the other side for a total of 80 mm from each reference position.

Figure 4:
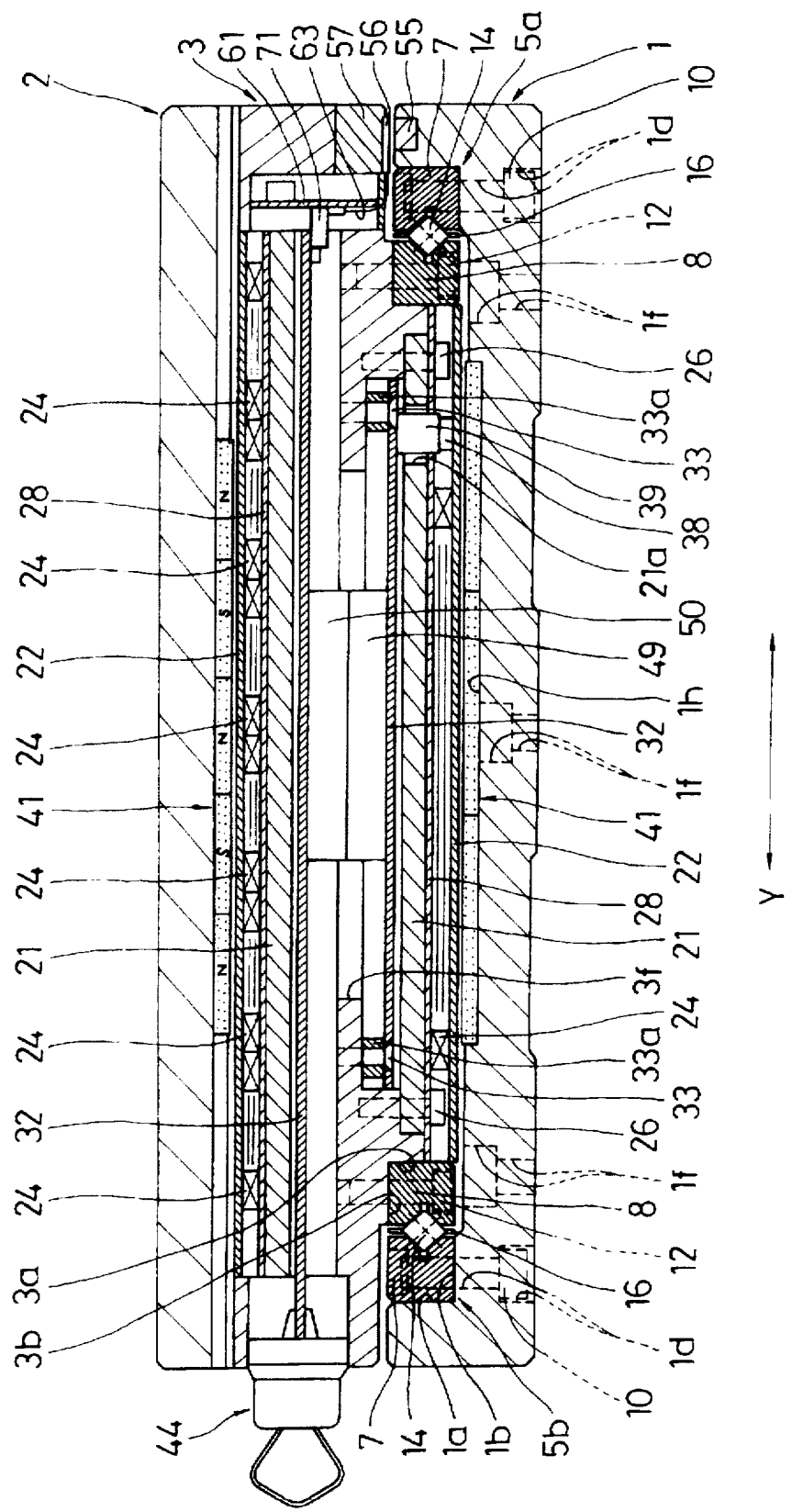
FIG. 4 is a cross-sectional view taken along line II—II relating to FIG. 2.
Figure 5:
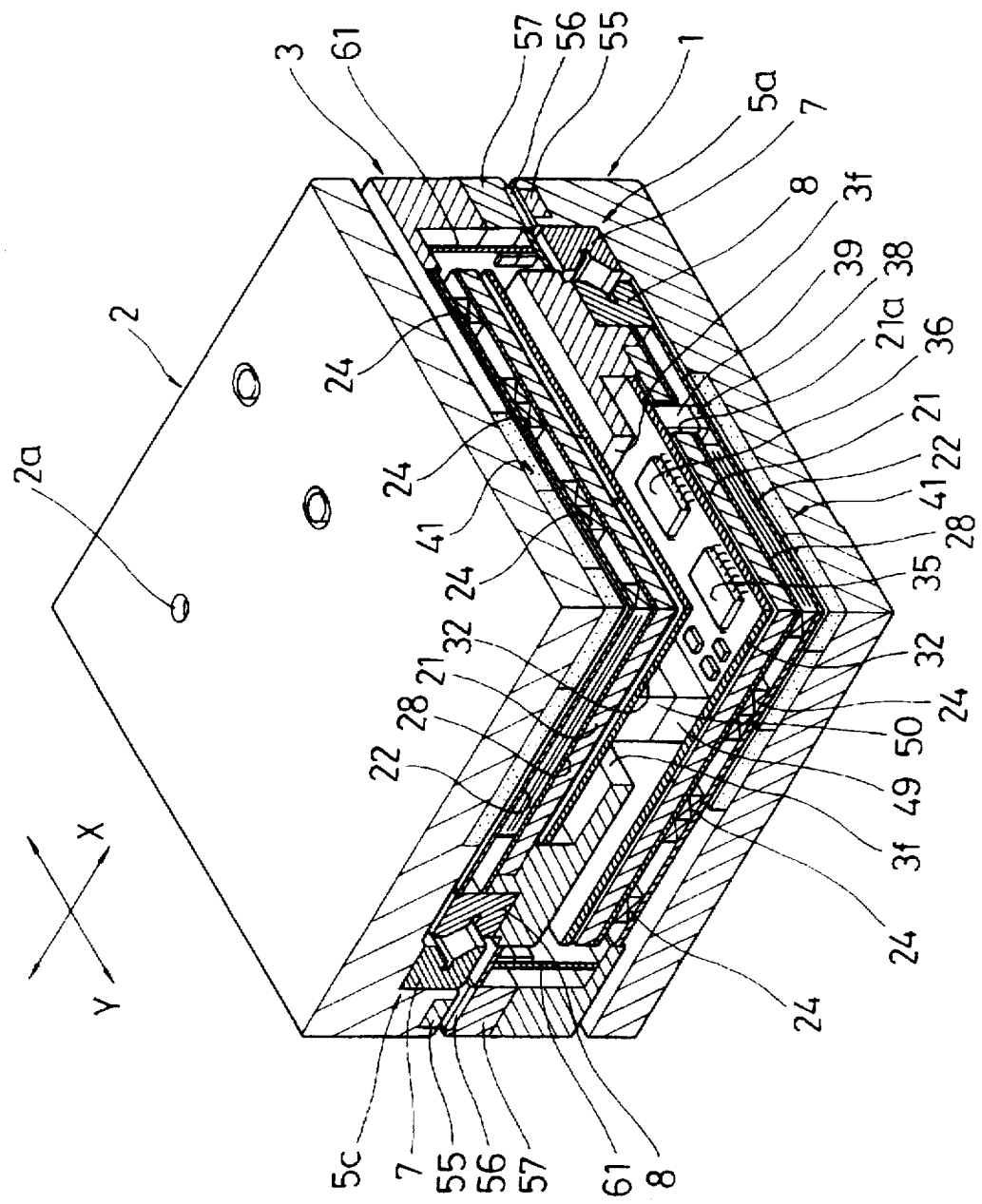
FIG. 5 is a perspective view as viewed from line III—III relating to FIG. 2.

FIGS. 4 and 5 are drawings showing cross-sectional views taken along lines II—II and III—III, respectively, relating to FIG. 2. As shown in these cross-sectional views as well as in FIGS. 1 and 3, two sets of linear motion guide units 5a and 5b are juxtaposed between bed 1 and X table 3. In addition, two sets of linear motion guide units 5c and 5d are similarly juxtaposed between said X table 3 and Y table 2 perpendicular to said linear motion guide units 5a and 5b.

These linear motion guide units 5a through 5d acts as guiding devices that guide bed 1, Y table 2 and X table 3 while allowing to perform relative movement. In other words, bed 1 and X table 3 move relative to each other in the X direction, while said X table 3 and Y table 2 move relative to each other in the Y direction at a right angle to this X direction.

The following provides a detailed explanation of the above-mentioned linear motion guide units 5a through 5d.

Furthermore, since each linear motion guide unit 5a through 5d is composed in a similar constitution, an explanation is only provided for one linear motion guide unit 5b as a representative example. However, in FIG. 1 and FIGS. 3 through 5, those constituent members of the other linear motion guide units 5a, 5c and 5d for which explanations are not provided that correspond to the constituent members of linear motion guide unit 5b for which an explanation is provided are indicated with the same reference numerals as those used for said linear motion guide unit 5b.

Figure 6:
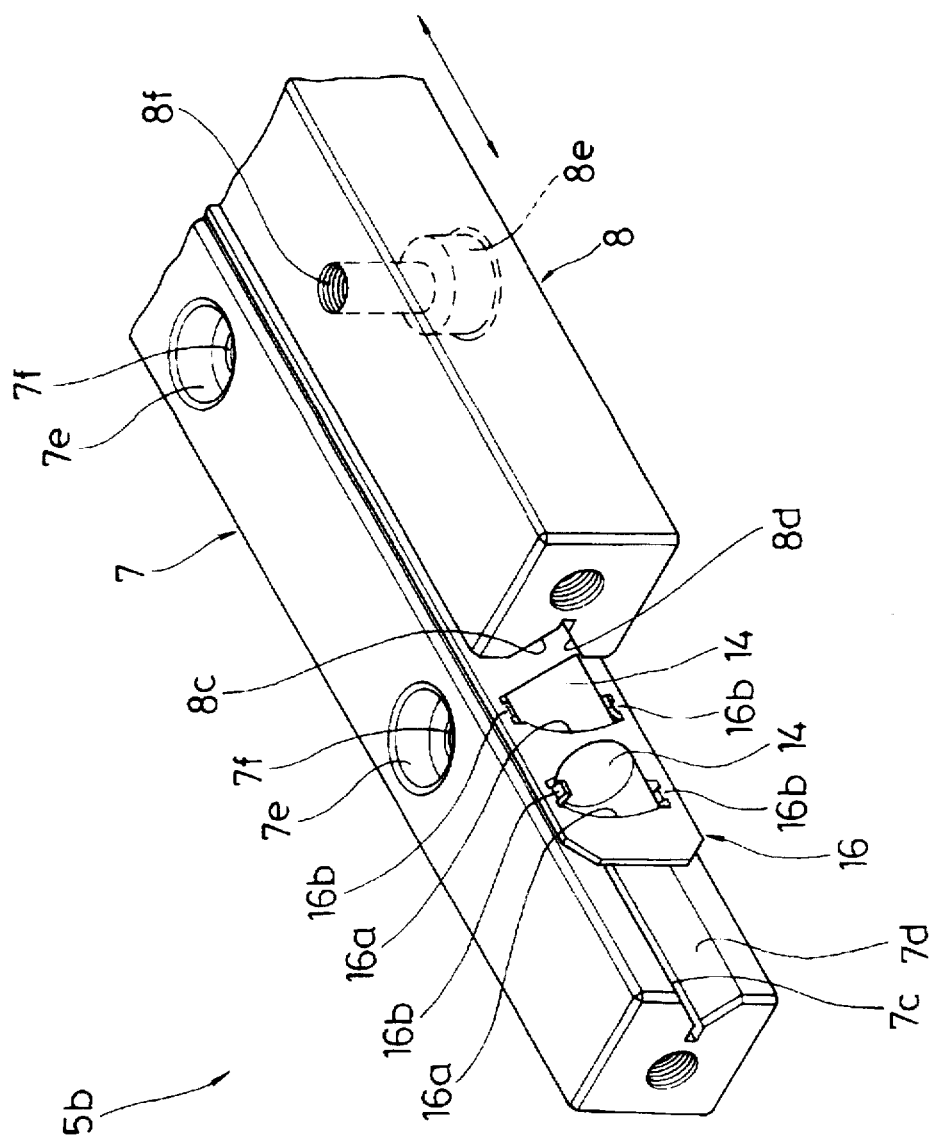
FIG. 6 is a perspective view showing a portion of a finite linear motion rolling guide unit equipped on the XY table shown in FIGS. 1 through 3.

As shown in FIG. 6, linear motion guide unit 5b is a so-called cross roller type of finite linear motion rolling guide unit, and has two roughly column-shaped long track members 7 and 8. One track member 7 is fixed on bed 1, while the other track member 8 is installed on X table 3. More specifically, as shown in FIG. 4, mounting surfaces 1a, 1b, 3a and 3b are formed in bed 1 and X table 3, two each of which are perpendicular to the other two. Both track members 7 and 8 are positioned by bringing in close contact with these mounting surfaces.

As shown in FIG. 6, a track groove, namely a track, having a roughly V-shaped cross-section and two perpendicular track surfaces 7c and 7d, is formed along the lengthwise direction in one side of track member 7.

As is also shown in FIG. 6, countersunk portions 7e and threaded holes 7f are concentrically formed in track member 7 from its top towards its bottom, and bolts 10 (with hexagon sockets) shown in FIG. 4 are screwed into these threaded holes 7f. These bolts 10 are inserted into insertion holes 1d formed in the bottom surface of bed 1, and track member 7 is fastened to bed 1 by said bolts 10.

On the other hand, as can be seen from FIG. 6, a track groove, namely a track, having a roughly V-shaped cross-section is also formed track member 8 in opposition to the track groove of track member 7, and said track groove has two perpendicular track surfaces 8c and 8b. As shown in the same drawing, countersunk portions 8e and threaded holes 8f are concentrically formed in said track member 8 from its bottom towards its top. The tops of bolts 12 (with hexagon sockets) shown in FIG. 4 are inserted into these countersunk portions 8e and screwed into threaded holes formed in X table 3. As a result, track member 8 is fastened to X table 3.

As shown in FIG. 6, a plurality of rolling elements in the form of cylindrical rollers 14 are arranged between each track groove of both of the above-mentioned track members 7 and 8. Cage 16 that holds each cylindrical roller 14 while allowing to rotate freely is juxtaposed between said track members 7 and 8. Each cylindrical roller 14 is arranged so that its rotating axis is perpendicular to that of adjacent roller. Cage 16 is formed roughly into the shape of a rectangular plate, and contains insertion holes 16a, into which each cylindrical roller 14 is inserted on an incline, and tabs, 16b that prevent each cylinder roller 14 from coming out of said insertion holes 16a by engaging with the end of each said cylindrical roller 14.

In the above-mentioned constitution, each cylindrical roller 14 bears the load while rolling over the track grooves of track members 7 and 8 accompanying relative movement of both said track members 7 and 8. Linear motion guide unit 5a on the other side operates in the same way, and X table 3 moves while being guided smoothly relative to bed 1 by both linear motion guide units 5a and 5b.

In addition, this applies similarly to Y table 2, with said Y table 2 moving smoothly relative to the above-mentioned X table 3 by the other two sets of linear motion guide units 5c and 5d.

The finite linear motion rolling guide units in the form of the above-mentioned linear motion guide units 5a through 5d are compact and lightweight, and as a result of employing these linear motion guide units as guiding devices, said XY table can be also, be made compact and lightweight. However, various other types of guide units can naturally also be employed as guiding devices.

However, in the present embodiment, the above-mentioned bed 1 is stationary, while the Y table operates as the moving side. Consequently, as shown in FIGS. 2 and 4, for example 6 bolt insertion holes 1f are formed in bed 1, and said bed 1 is fastened to a work bench and so forth by bolts (with hexagon sockets: not shown) inserted into each of said bolt insertion holes 1f.

Furthermore, in FIG. 2, each insertion hole 2a shown in proximity to each of the above-mentioned bolt insertion holes 1f is a threaded hole for fastening an object (driven object) to said Y table 2.

Continuing, the following provides an explanation of the two sets of linear electromagnetic actuators provided between the above-mentioned bed 1 and X table 3 or between X table 3 and Y table 2 to provide driving force.

Although the linear electromagnetic actuators provided are linear direct current motors in the case of the present embodiment, linear pulse motors, voice coil motors or various other types of actuators can also be applied.

In addition, since the two sets of linear direct current motors provided have similar constitutions, the following provides a detailed description of the linear direct current motors on the lower side, namely the linear direct current motors provided between bed 1 and X table 3, as representative examples. The linear direct current motors on the top side, namely the linear direct current motors that provide driving force to X table 3 and Y table 2, will be explained briefly later. However, in FIGS. 2 through 5, those constituent members of the upper linear direct current motors that correspond to the constituent members of said lower linear direct current motors are indicated with the same reference numerals as those used for said lower linear direct current motors.

Firstly, an explanation is provided of the primary side, namely the electrical power supply side, of said linear direct current motors.

As shown in FIGS. 4 and 5, this primary side has coil yoke 21 arranged on the lower side of X table 3, coil substrate 22 arranged on the lower side of said coil yoke 21, and, for example six, armature coils 24 adhered to the upper surface of said coil substrate 22 and arranged in a row along the X direction in which X table 3 moves. Said coil yoke 21 is fastened to X table 3 by screws 26, and coil substrate 22 and each armature coil 24 are fastened together to said X table 3 using screws not shown.

Furthermore, insulating sheet 28, which serves as an electrical insulator, is juxtaposed between coil yoke 21 and each armature coil 24.

Figure 7:
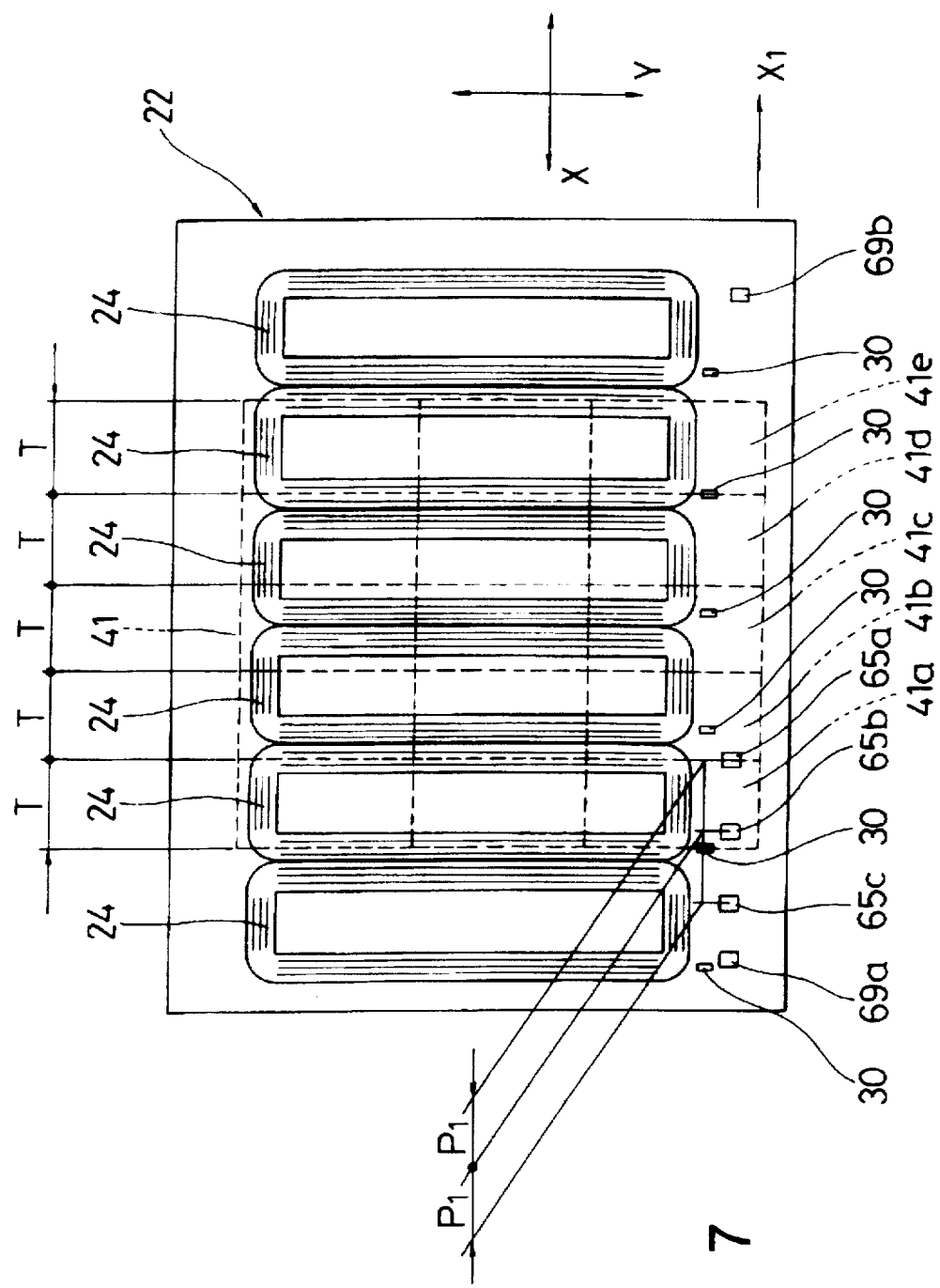
FIG. 7 is an overhead view of a coil substrate and so forth that are constituent members of a linear direct current motor equipped on the XY table shown in FIGS. 1 through 3.

FIG. 7 is an overhead view of the above-mentioned coil substrate 22. As shown in the drawing, an equal number of Hall effect elements (magnetic resistance (MR) elements can also be used) 30 are provided on said coil substrate 22 corresponding to each armature coil 24. These Hall effect elements 30 emit a signal corresponding to the amount of lines of magnetic force emitted by a field magnet serving as the secondary side of the linear direct current motors (to be described later) when said field magnet approaches. The supply and interruption of electrical power to each of the above-mentioned armature coils 24 is controlled based on this signal.

As shown in FIGS. 4 and 5, drive substrate 32 is provided on X table 3 on the upper side of the above-mentioned coil yoke 21, and is fastened to said X table 3 by screws 33. As shown in FIG. 4, spacers 33a are fit onto said screws 33 between said drive substrate 32 and X table 3.

Drive substrate 32 is for supplying electrical power and so forth to each of the above-mentioned armature coils 24, and incorporates a drive circuit composed of various electronic components 35, 36 and so forth shown in FIG. 5.

As shown in FIGS. 4 and 5, coil substrate 22 and drive substrate 32, which are positioned apart from each other with coil yoke 21 in between, are connected by female and male connectors 38 and 39. Connector 39 is inserted into through hole 21 formed in coil yoke 21. Supply of electrical power from drive substrate 32 to coil substrate 22 and therefore to each armature coil 24 and so forth, and the transmission of signals emitted by each of the above-mentioned Hall effect elements 30 are performed through these connectors 38 and 39.

On the other hand, the secondary side of the linear direct current motors is composed in the manner described below.

As shown in FIG. 4, recess 1h is formed in the upper side of bed 1, and field magnet 41 is fit into and fixed in said recess 1h. This field magnet 41 serves as the secondary side. Said field magnet 41 is also shown in FIGS. 5 and 7.

Figure 8:
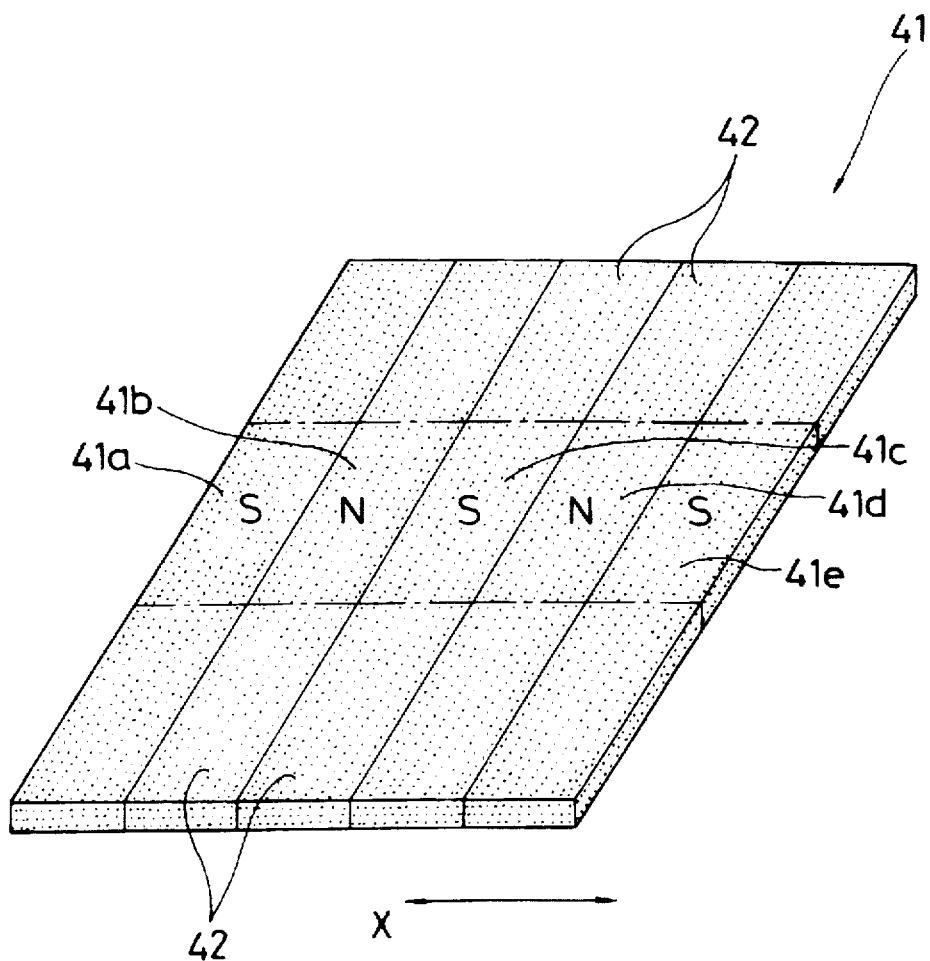
FIG. 8 is a perspective view of a field magnet that serves as the secondary side of the linear direct current motor equipped on the XY table shown in FIGS. 1 through 3.

As shown in FIG. 8, field magnet 41 consists of, for example 15, smaller magnets 42 in the shape of rectangular plates of the same shape and dimensions that overall form a rectangular plate by arranging two-dimensionally. A plurality, in the case five, of N and S magnetic poles are magnetized so as to be alternately arranged in a row along direction X of the reciprocating movement of the above-mentioned X table 3.

In the linear direct current motor of the above-mentioned constitution, by supplying electric current to each armature coil 24 at a prescribed timing, thrust is generated between the primary and secondary sides based on Fleming's left hand rule, resulting movement of the primary side, namely X table 3 integrated into a single unit with armature coils 24 and so forth. In other words, said linear direct current motor operates as a moving coil type of motor.

On the other hand, with respect to the upper linear direct current motor provided to as to provide driving force between X table 3 and Y table 2, the primary side composed of armature coils 24 and so forth is installed on the upper surface of X table 3, and field magnet 41 serving as the secondary side is attached to the lower surface of Y table 2. In other words, this linear direct current motor operates as a moving magnet type of motor with X table 3 serves as the stationary side, and Y table 2 integrated into a single unit with said field magnet 41 moves by supplying electrical power to each of said armature coils 24.

Based on the above, in the case of said XY table, each of the primary sides of the two sets of upper and lower linear direct current motors, namely the electrical power supply sides, are provided on X table 3.

The following provides an explanation of the constitution relating to the supply of electrical power and so on to both upper and lower linear direct current motors.

As shown in FIGS. 1 through 4, cord 47 is connected by means of female and male connectors 44 and 45 to drive substrate 32 for supplying electrical power and so forth to the upper linear direct current motor. Female connector 44 is fixed to X table 3. Female connector 44 is shown in FIGS. 2 through 4, while male connector 45 and cord 47 are shown in FIGS. 1 and 2.

The above-mentioned cord 47 contains a cord for supplying electrical power, and electrical power is supplied to drive substrate 32 for providing electrical power and so forth to the upper linear direct current motor through this power supply cord. Supply of electrical power to coil substrate 22 equipped on the upper linear direct current motor, and thus to each armature coil 24, is made from this drive substrate through connectors not shown.

As shown in FIGS. 4 and 5, both drive substrates 32 provided on the upper and lower sides of X table 3 corresponding to each upper and lower linear direct current motor are connected by female and male connectors 49 and 50. These connectors 49 and 50 divide a portion of the current supplied to drive substrate 32 on the upper side through the above-mentioned connectors 44 and 45 to the drive substrate 32 on the lower side. The current supplied to said lower drive substrate 32 is supplied to coil substrate 22 equipped on the lower linear direct current motor through connectors 38 and 39 shown in FIGS. 4 and 5, and thus to each armature coil 24.

Electrical power is supplied to both upper and lower linear direct current motors according to the above-mentioned constitution.

In addition, the transmission of signals emitted from each Hall effect element 30 (see FIG. 7) installed on coil substrate 22 equipped on the upper and lower linear direct current motors is performed through paths provided in parallel with the above-mentioned path for supply of electrical power.

Namely, the signals emitted from the Hall effect element on coil substrate 22 equipped on the upper linear direct current motor are transmitted to upper drive substrate 32 through a connector not shown, and further led out through the above-mentioned connectors 44 and 45, by means of the above-mentioned power cord within cord 47.

Signals emitted from Hall effect element 30 on coil substrate 22 equipped on the lower linear direct current motor are transmitted to lower drive substrate 32 through connectors 38 and 39 shown in FIGS. 4 and 5, and further led out through the above-mentioned connectors 44 and 45 by means of the above-mentioned power cord within cord 47.

Next, an explanation is provided of detection of the relative positions of the above-mentioned bed 1 and X table 3, and the two sets of detection devices respectively provided so as to detect the relative positions of X table 3 and Y table 2.

Furthermore, since the constitutions of these two sets of detection devices are mutually the same, the following only provides a detailed description of the detection device for detecting the relative positions of bed 1 and X table 3 as a representative example. The detection device for detecting the relative positions of X table 3 and Y table 2 will be explained briefly later. However, those constituent members of the detection device for which an explanation is omitted that correspond to the constituent members of the detection device for which an explanation is provided below are indicated with the same reference numerals as those used for the detection device for which an explanation is provided.

In FIGS. 1, 4 and 5, this detection device is composed of a detected portion in the form of linear scale 55 and a detecting portion in the form of sensor 56. Said linear scale 55 is embedded in the side of bed 1 so that only its upper surface is exposed. In addition, sensor 56 is fixed on the lower side of X table 3 by means of sensor block 57 corresponding to said linear scale 55.

Figure 9:
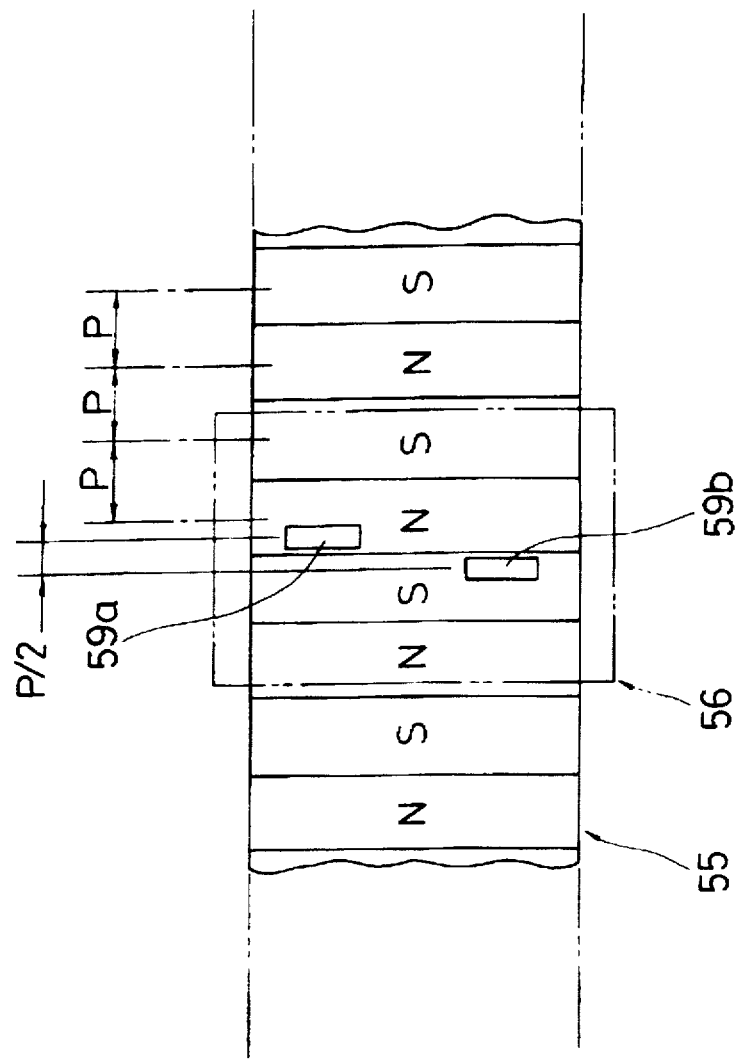
FIG. 9 is an enlarged view showing the essential portion of a linear scale and sensor equipped on the XY table shown in FIGS. 1 through 3.

The above-mentioned linear scale 55 is composed of a magnetic scale that extends in the direction of movement of X table 3, and is magnetized by multiple poles consisting of N and S magnetic poles alternately arranged at a narrow pitch along its lengthwise direction as shown in FIG. 9.

As shown in the same FIG. 9, two Hall effect elements 59a and 59b for the A phase and B phase are arranged on sensor 56 mutually shifted by ½ the above-mentioned pitch. As a result of employing this constitution, both A phase and B phase signals are obtained, thereby enabling detection of relative position and discrimination of direction of movement.

As shown in FIGS. 4 and 5, sensor substrate 61 is arranged in close proximity to the above-mentioned sensor 56, and is fixed to X table 3. A circuit is incorporated in this sensor substrate 61 for amplification and so forth of the signals sent from sensor 56. As shown in FIG. 4, this circuit and sensor 56 are connected by flexible substrate 63, and reception of signals and so forth is performed through this flexible substrate 63.

The above-mentioned detection device is equipped with the following constitution in the form of a reference position signal generation device that generates a signal when bed 1 and X table 3 have reached the reference positions of their relative motion.

Namely, as shown in FIG. 7, for example, three Hall effect elements (magnetic resistance (MR) elements can also be used) 65a through 65c are arranged in a row on coil substrate 22 at an equal pitch $P_1$ in direction X of relative motion. This pitch $P_1$ is smaller than each width T of the five magnetic poles possessed by field magnet 41, and these Hall effect elements 65a through 65c emit a signal in response to each of said magnetic poles.

FIG. 7 shows the state in which bed 1 and X table 3 are at the reference positions of their mutual relative motion. In this state, the boundary between the first magnetic pole 41a and second magnetic pole 41b of field magnet 41 is located directly over the first Hall effect element 65a, and said first magnetic pole 41a acts on second Hall effect element 65b.

Figure 10:
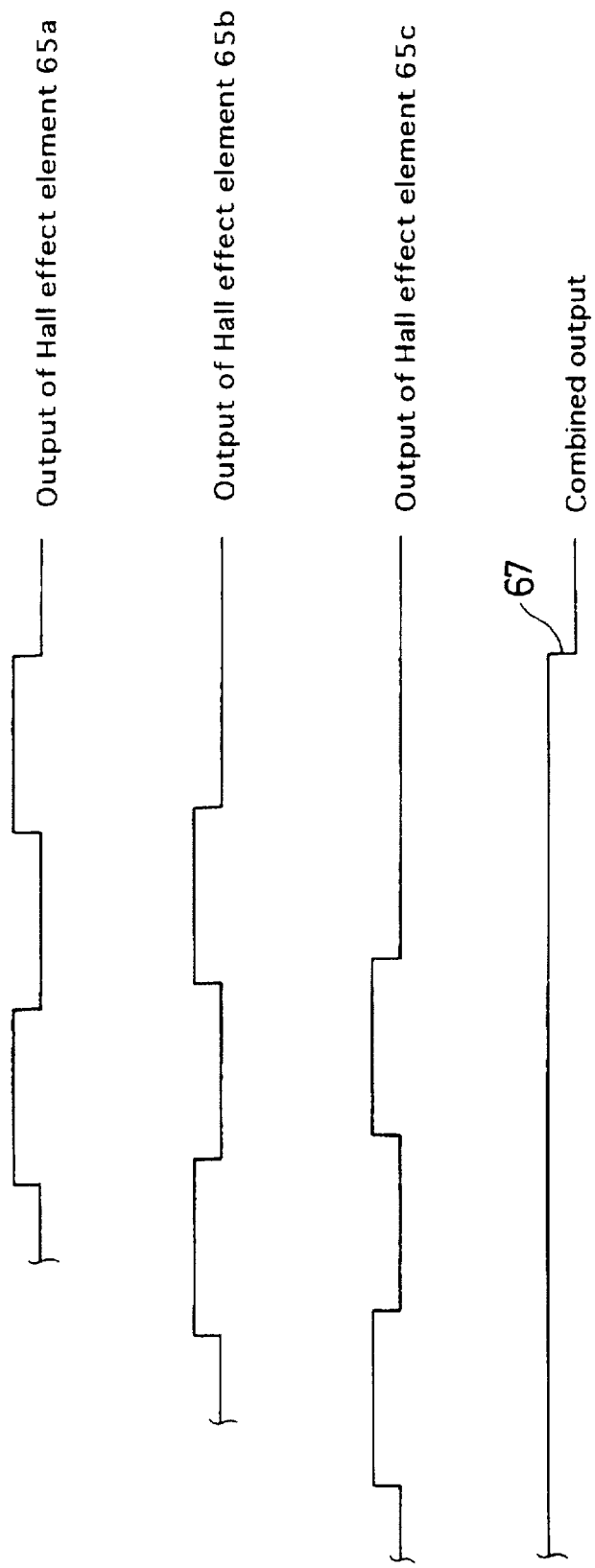
FIG. 10 is a diagram showing the output of each Hall effect element for detecting the reference position of operation of the XY table shown in FIGS. 1 through 3, along with its combined output.

In the case X table 3 moves from this state in the direction indicated by arrow $X_1$ in FIG. 7, each output of the three Hall effect elements 65a through 65c along with their combined output become as shown in FIG. 10.

Namely, rising portion 67 in the above-mentioned combined output is always at one location, and that is the reference position signal.

In addition, in the case of X table 3 moves in the opposite direction of $X_1$ indicated with an arrow in FIG. 7, an output is no longer obtained from each Hall effect element 65a through 65c, and a combined signal is also no longer obtained. Accordingly, the above-mentioned rising portion 67 of the combined signal is again obtained when X table 3 returns to the state of FIG. 7 by reverse operation, allowing it to be determined that bed 1 and X table 3 are mutually located at their reference positions.

The reference position signal generation device of the above-mentioned constitution is employed in this XY table because the state in which X table 3 is completely overlapping bed 1 is stipulated to be the reference position of said X table 3. In other words, this constitution is employed in order to obtain a reference position with high precision when the reference position is set at the center position of the operating stroke (80 mm) of X table 3 as in the present embodiment.

However, as shown in FIG. 7, two Hall effect elements (magnetic resistance (MR) elements can also be used) 69a and 69b are provided on coil substrate 22 that act as limit sensors that emit a signal after detecting that the above-mentioned X table 3 has operated in deviation from its operating stroke. When X table 3 deviates from its operating stroke, these Hall effect elements 69a and 69b respectively emit a signal in response to both ends of magnetic poles 41a and 41e (see FIGS. 7 and 8) of field magnet 41.

Although the above-mentioned detection device is for detecting the relative positions of bed 1 and X table 3, the other detection device for detecting the relative positions of X table 3 and Y table 2 is composed in a similar manner, including the constitutions of the above-mentioned reference position signal generation device and limit sensors. However, in the case of the detection device for detecting the relative positions of X table 3 and Y table 2, its detecting portion in the form of sensor 56 is installed on X table 3, while its detected portion in the form of linear scale 55 is attached to Y table 2 as shown in FIGS. 1, 3 and 5.

Here, an explanation is provided of the connection state for transmitting signals from the above-mentioned detection devices to a controller (not shown) that governs operational control of this XY table.

Firstly, with respect to the detection device for detecting the relative positions of bed 1 and X table 3, the signal from its sensor 56 is first transmitted to sensor substrate 61 by flexible substrate 63 shown in FIG. 4. Next, the signal from said sensor substrate 61 is transmitted to upper drive substrate 32 through connector 71 shown in the same drawing, and further led out through connectors 44 and 45 by means of a power cord within cord 47 (see FIGS. 1 and 2).

In addition, the signals emitted by each Hall effect element 65a through 65c and 69a and 69b for reference position signal generation and limit position signal generation shown in FIG. 7 are transmitted to lower drive substrate 32 by means of connectors 38 and 39 shown in FIGS. 4 and 5, additionally transmitted to upper drive substrate 32 through connectors 49 and 50, and further led out through connectors 44 and 45 by means of the power cord within the above-mentioned cord 47.

On the other hand, with respect to the detection device for detecting the relative positions of X table 3 and Y table 2, the signal from its sensor 56 (see FIGS. 1 and 5) is transmitted to sensor substrate 61 shown in FIG. 5 by means of a flexible substrate not shown. It is then transmitted to upper drive substrate 32 from said sensor substrate 61 by means of a connector not shown, and led out through connectors 44 and 45 by means of the power cord within cord 47 (see FIGS. 1 and 2).

In addition, each of the Hall effect elements (not shown) for reference position signal generation and limit position signal generation equipped on said detection device are installed on upper coil substrate 22, and the signals emitted by each of said Hall effect elements are transmitted to upper drive substrate 32 by means of connectors not shown, and led out through connectors 44 and 45 by means of the power cord within the above-mentioned cord 47.

Based on the explanation provided thus far, in this XY table, the supplying of electrical power to the two sets of linear direct current motors for respectively driving X table 3 and Y table 2, and the signal transmission from each Hall effect element for relative position detection and so forth are performed centrally on an intermediate movement member in the form of X table 3.

Thus, each cord for supplying of electrical power and signal transmission is ultimately collected within a single cord 47 as shown in the present embodiment. Since the number of cords that ultimately connect with the outside (controller, etc.) is low, there is little possibility of the cord breaking even when said XY table is operated for a long time no matter how fast it is operated, thus resulting in a high degree of reliability. In addition, this XY table is suitable for use in a clean environment since generation of dust caused by sliding of the cord is inhibited.

In addition, since the number of cords connected with the outside is low, the cord has no effect on operation of the XY table, which is effective with respect to small (compact) XY tables which are required to have small stroke, fast operation and a large number of reciprocation cycles.

Based on the above, the XY table as claimed in the present invention contributes to faster operation, increased durability, prevention of dust generation and small (compact) size in machine tools, industrial robots and so forth in which it is incorporated.

In addition, in said XY table, the supply of electrical power to linear direct current motors and the obtaining of signals from each Hall effect element is collected at a single location, and connected to the outside by a single cord 47 (see FIGS. 1 and 2). Thus, the likelihood of wiring errors by the user is reduced, thereby resulting in easier handling.

However, in said XY table, two drive substrates 32 provided respectively corresponding to two sets of linear direct current motors are installed in parallel on the upper and lower sides of X table 3, and connection between both said drive substrates 32 is made by connectors 49 and 50 (see FIGS. 4 and 5). Thus, both drive substrates 32 are provided collectively and in compact form on X table 3. Moreover, since connection between both drive substrates 32 is made with a simple operation by connectors 49 and 50 only, further reduction in size, reduction in the number of parts and reduction in the number of assembly steps of this XY table is achieved.

Figure 11:
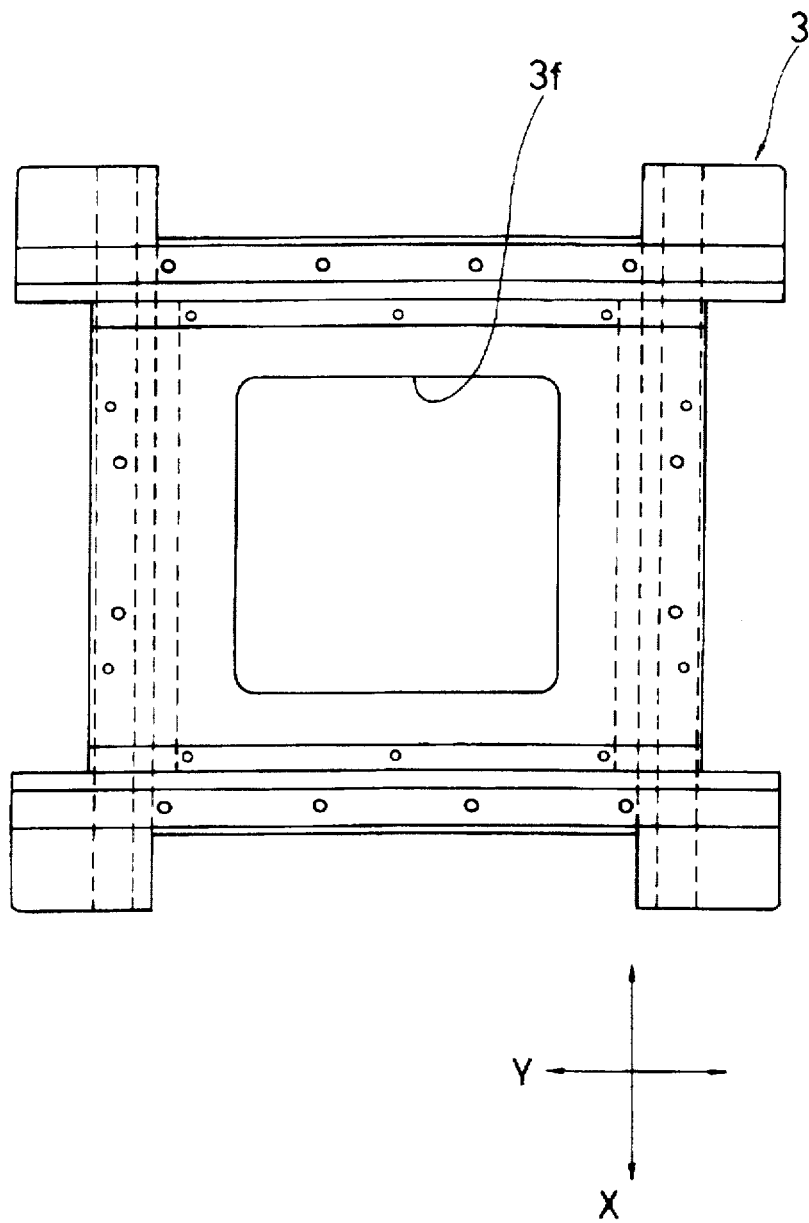
FIG. 11 is an overhead view of an X table equipped on the XY table shown in FIGS. 1 through 3.

In addition, as shown in FIGS. 4, 5 and 11, opening 3f is formed in the above-mentioned X table 3 for insertion of the above-mentioned connectors 49 and 50 from upper and lower, and this opening 3f is relatively large.

Namely, this opening 3f is not only used for electrical connection between upper and lower drive substrates 32, but also as a so-called lightening hole. As a result of providing this lightening hole, X table 3 becomes lighter, which together with increasing the acceleration and deceleration of the table, makes it easier to achieve greater precision in positioning.

Furthermore, although bed 1 is used as the stationary side in the present embodiment, Y table 2 can also be used as the stationary side by inverting the XY table. In this XY table, the two-dimensional shape of bed 1, X table 3 and Y table 2 is a square of equal dimensions. Moreover, as shown in FIG. 2 and other drawings, since connectors 44 and 45 for connecting to the outside are provided in the center on the side of X table 3, the XY table can be used easily even if inverted.

In addition, although only one of bed 1, Y table 2 and X table 3 is respectively provided and their two-dimensional shapes are of the same shape and dimensions in the present embodiment, a plurality of said bed 1, Y table 2 and X table 3 may also be provided, and their two-dimensional shapes and dimensions and so forth may be different.

As has been explained above, in the XY table as claimed in the present invention, supply of electrical power and so forth to linear electromagnetic actuators is performed with an intermediate movement member.

Thus, each cord for performing said supply of electrical power and so forth can be collected into, for example, a single cord as shown in the embodiment. Since the number of cords that are ultimately connected to the outside is significantly low in this manner, there is little possibility of the cord breaking even when said XY table is operated for a long time no matter how fast it is operated, thus resulting in a high degree of reliability. In addition, this XY table is suitable for use in a clean environment since generation of dust caused by sliding of the cord is inhibited.

In addition, since the number of cords connected with the outside is low, the cord has no detrimental effect on operation of the XY table, which is effective with respect to small stroke, fast operation and a large number of reciprocation cycles that are requirements for use in small (compact) XY tables.

In addition, in the above-mentioned XY table, an opening is formed in the above-mentioned intermediate movement member and electrical connections are made through said opening. By making this opening relatively large, it not only is for making electrical connections, but can also serve as a so-called lightening hole, which together with making said intermediate movement member lighter to increase its acceleration and deceleration, it also makes it easier to achieve greater precision in positioning.

Moreover, in the above-mentioned XY table, drive substrates for supplying electrical power and so forth to the above-mentioned linear electromagnetic actuators are provided on both sides of the above-mentioned intermediate movement member, and connection between said drive substrates is made by connectors inserted through the above-mentioned opening. Since both drive substrates are provided compactly and collectively on said intermediate movement member, and connection between both drive substrates is performed easily using only those connectors, further reduction in size, reduction in number of parts and reduction in the number of assembly steps of this XY table are achieved.

In addition, the above-mentioned XY table is equipped with a detection device for detecting the relative positions of relative movement members and an intermediate movement member. Said detection device has a detected portion attached to said relative movement members, and a detecting portion installed on said intermediate movement member. In other words, in this intermediate movement member, in addition to the supplying of electrical power to the above-mentioned linear electromagnetic actuators, more specifically, the transmitting of signals from said detecting portion is also performed collectively.

Thus, each type of cord for supplying electrical power and sending signals is ultimately gathered into a single cord as mentioned above.

In addition, in the above-mentioned XY table, the supplying of electrical power and so forth to the above-mentioned linear electromagnetic actuators and detecting portion is collected at a single location. Since connection can be made with the outside by this single cord, the likelihood of wiring errors by the user is reduced, thereby resulting in easier handling.

What is claimed is:

1. An XY table equipped with: relative movement members arranged on both outer sides, an intermediate movement member arranged between said relative movement members, a guiding device that guides said relative movement members and intermediate movement member while allowing to freely perform relative movement, and linear electromagnetic actuators that provide driving force between each of said relative movement members and said intermediate movement member; wherein, each primary side of said linear electromagnetic actuators is provided on said intermediate movement member, and supply of electrical power and so forth to said linear electromagnetic actuators is performed with said intermediate movement member.

2. An XY table as set forth in claim 1 wherein an opening is formed in said intermediate movement member, and electrical connection is performed through said opening.

3. An XY table as set forth in claim 2 wherein drive substrates for performing supply of electrical power and so forth to the above-mentioned linear electromagnetic actuators are provided on both sides of the above-mentioned intermediate movement member, and connection between said drive substrates is performed by connectors inserted through the above-mentioned opening.

4. An XY table as set forth in claim 1 equipped with a detection device for detecting the relative positions of the above-mentioned relative movement members and above-mentioned intermediate movement member, and said detection device has detected portions attached to the above-mentioned relative movement members, and a detecting portion installed on the above-mentioned intermediate movement member.

5. An XY table as set forth in claim 4 wherein the supply of electrical power and so forth to the above-mentioned linear electromagnetic actuators and the above-mentioned detecting portion is collected at a single location and connected with the outside.

6. An XY table as set forth in claim 1 wherein the above-mentioned linear electromagnetic actuators are linear direct current motors, the above-mentioned detection device has a reference position signal generation device, and said reference position signal generation device is composed of a plurality of magnetic sensors which emit a signal in response to a field magnet of said linear direct current motor, and which are arranged in row at a pitch smaller than the width of the magnetic poles of said field magnet.

7. An XY table as set forth in claim 1 wherein the above-mentioned guiding device is equipped with a pair of track members, in which tracks are formed along the lengthwise direction, that are arranged so that said corresponding tracks are in mutual opposition, rolling elements arranged between said tracks, and a cage that holds said rolling elements while allowing to rotate freely.

* * * * *